US011668655B2

(12) United States Patent
Gaind et al.

(10) Patent No.: US 11,668,655 B2
(45) Date of Patent: Jun. 6, 2023

(54) MULTIMODE DEFECT CLASSIFICATION IN SEMICONDUCTOR INSPECTION

(71) Applicant: KLA-Tencor Corporation, Milpitas, CA (US)

(72) Inventors: Vaibhav Gaind, Fremont, CA (US); Grace H. Chen, Los Gatos, CA (US); Amrit Poudel, Milpitas, CA (US); Mark S. Wang, San Ramon, CA (US)

(73) Assignee: KLA Corporation, Milpitas, CA (US)

( * ) Notice: Subject to any disclaimer, the term of this patent is extended or adjusted under 35 U.S.C. 154(b) by 629 days.

(21) Appl. No.: 16/272,528

(22) Filed: Feb. 11, 2019

(65) Prior Publication Data

US 2020/0025689 A1 Jan. 23, 2020

Related U.S. Application Data

(60) Provisional application No. 62/767,916, filed on Nov. 15, 2018, provisional application No. 62/701,007, filed on Jul. 20, 2018.

(51) Int. Cl.
*G01N 21/88* (2006.01)
*G01N 21/95* (2006.01)

(52) U.S. Cl.
CPC ..... *G01N 21/8851* (2013.01); *G01N 21/9501* (2013.01); *G01N 2021/8874* (2013.01); *G01N 2021/8887* (2013.01)

(58) Field of Classification Search
CPC .................. G01N 21/8851; G01N 2021/8874
See application file for complete search history.

(56) References Cited

U.S. PATENT DOCUMENTS 6,078,443 A * 6/2000 Yu .................. F21S 10/007
362/293
6,608,321 B1 8/2003 Fontaine et al.
(Continued)

FOREIGN PATENT DOCUMENTS

CN 201444212 U * 4/2010 ............. G02B 21/14
JP H0474951 A 3/1992
(Continued)

OTHER PUBLICATIONS

Machine translation of CN201444212 (Year: 2010).*
(Continued)

*Primary Examiner* — Matthew G Marini
(74) *Attorney, Agent, or Firm* — Huse IP Law; Charles C. Huse

(57) ABSTRACT

A semiconductor-inspection tool scans a semiconductor die using a plurality of optical modes. A plurality of defects on the semiconductor die are identified based on results of the scanning. Respective defects of the plurality of defects correspond to respective pixel sets of the semiconductor-inspection tool. The scanning fails to resolve the respective defects. The results include multi-dimensional data based on pixel intensity for the respective pixel sets, wherein each dimension of the multi-dimensional data corresponds to a distinct mode of the plurality of optical modes. A discriminant function is applied to the results to transform the multi-dimensional data for the respective pixel sets into respective scores. Based at least in part on the respective scores, the respective defects are divided into distinct classes.

14 Claims, 4 Drawing Sheets

(56) References Cited

U.S. PATENT DOCUMENTS

| | | | |
|---|---|---|---|
| 7,446,865 | B2 | 11/2008 | Chung et al. |
| 7,720,275 | B2 | 5/2010 | Shibuya et al. |
| 9,037,280 | B2 | 5/2015 | Dishner et al. |
| 9,601,393 | B2 | 3/2017 | Lee et al. |
| 9,778,206 | B2 | 10/2017 | Honda et al. |
| 9,816,939 | B2 | 11/2017 | Duffy et al. |
| 10,115,040 | B2 | 10/2018 | Brauer |
| 10,204,290 | B2 | 2/2019 | Yong |
| 2005/0140958 | A1* | 6/2005 | Fiolka ................. G03F 7/70058 355/71 |
| 2007/0041609 | A1 | 2/2007 | Chung et al. |
| 2012/0294500 | A1 | 11/2012 | Utsunomiya et al. |
| 2013/0294680 | A1 | 11/2013 | Harada et al. |
| 2014/0198975 | A1 | 7/2014 | Nakagaki et al. |
| 2015/0369752 | A1* | 12/2015 | Honda ................. G01N 21/9501 356/237.2 |
| 2016/0025648 | A1* | 1/2016 | Duffy .................... H01J 37/222 356/237.5 |
| 2016/0259100 | A1* | 9/2016 | Uehara ................. G02B 5/205 |
| 2018/0114310 | A1 | 4/2018 | He et al. |
| 2019/0179874 | A1 | 6/2019 | Noda |

FOREIGN PATENT DOCUMENTS

| | | |
|---|---|---|
| JP | 2006266872 A | 10/2006 |
| JP | 2008543113 A | 11/2008 |
| JP | 2011156035 A | 8/2011 |
| JP | 2012517702 A | 8/2012 |
| JP | 2014149177 A | 8/2014 |
| JP | 2017528697 A | 9/2017 |
| KR | 20060124514 A | 12/2006 |
| KR | 20170100710 A | 9/2017 |
| TW | 201820187 A | 6/2018 |
| WO | 2012098615 A1 | 7/2012 |
| WO | 2018025361 A1 | 2/2018 |

OTHER PUBLICATIONS

PCT/US2019/042500, International Search Report, dated Nov. 13, 2019.

PCT/US2019/042500, Written Opinion of the International Searching Authority, dated Nov. 13, 2019.

Nagendra Kumar & Andreas G. Andreou, "On Generalizations of Linear Discriminant Analysis," Tech. Report JHU/ECE-96-07, Apr. 8, 1996 (Johns Hopkins University), pp. 1-30.

Quanquan Gu et al., "Generalized Fisher Score for Feature Selection," arXiv:1202.3725 (Feb. 14, 2012).

R.A. Fisher, "The Statistical Utilization of Multiple Measurements," Annals of Human Genetics, vol. 8, No. 4, pp. 376-386, 1938.

JP Patent App. No 2021-502984, Notice of Reasons for Refusal, dated Feb. 14, 2023 (in original Japanese with English machine translation).

Wikipedia, "Linear Classifier," Sep. 5, 2015 (The Wayback Machine), Japanese and English versions.

ROC (Taiwan) Intellectual Property Office, Office Action for TW Application No. 108124201, dated Mar. 3, 2023.

* cited by examiner

300 ⬎

┌─────────────────────────────────────────────────────────────────────────────┐
│ In a semiconductor-inspection tool, scan a semiconductor die using a plurality of optical modes. (302) │
│                                                                             │
│   ┌─────────────────────────────────────────────────────────────────────┐   │
│   │ Each optical mode of the plurality of optical modes has a distinct combination of optical │
│   │ characteristics. The optical characteristics are selected from the group consisting of range of │
│   │ wavelengths, polarization, focus, illumination aperture, and collection aperture. (304) │
│   └─────────────────────────────────────────────────────────────────────┘   │
│   ┌─────────────────────────────────────────────────────────────────────┐   │
│   │ Simultaneously illuminate respective portions of the semiconductor die using the plurality of │
│   │ optical modes. Simultaneously image the respective portions of the semiconductor die using │
│   │ distinct detector arrays in the tool. (306)                         │
│   └─────────────────────────────────────────────────────────────────────┘   │
└─────────────────────────────────────────────────────────────────────────────┘
                                      ↓
┌─────────────────────────────────────────────────────────────────────────────┐
│ Identify a plurality of defects on the semiconductor die based on results of the scanning. Respective │
│ defects of the plurality of defects correspond to respective pixel sets of the semiconductor-inspection │
│ tool. The scanning fails to resolve the respective defects. The results include multi-dimensional data │
│ based on pixel intensity for the respective pixel sets, wherein each dimension of the multi-dimensional │
│ data corresponds to a distinct mode of the plurality of optical modes. (308) │
└─────────────────────────────────────────────────────────────────────────────┘
                                      ↓
┌─────────────────────────────────────────────────────────────────────────────┐
│ For the respective pixel sets, apply a discriminant function (linear or non-linear) to the results to │
│ transform the multi-dimensional data into respective scores. (310)          │
└─────────────────────────────────────────────────────────────────────────────┘
                                      ↓
┌─────────────────────────────────────────────────────────────────────────────┐
│ Based at least in part on the respective scores, divide the respective defects into distinct classes. (312) │
│                                                                             │
│   ┌─────────────────────────────────────────────────────────────────────┐   │
│   │ The distinct classes include defects of interest that will impede functionality of the │
│   │ semiconductor die and nuisance defects that will not impede functionality of the semiconductor │
│   │ die. (314)                                                          │
│   └─────────────────────────────────────────────────────────────────────┘   │
│   ┌─────────────────────────────────────────────────────────────────────┐   │
│   │ Convert the respective scores to probabilities that the respective defects belong to particular │
│   │ classes of the distinct classes. (316)                              │
│   └─────────────────────────────────────────────────────────────────────┘   │
│                                      ↓                                      │
│   ┌─────────────────────────────────────────────────────────────────────┐   │
│   │ Classify the respective defects based on the probabilities. (318)   │
│   └─────────────────────────────────────────────────────────────────────┘   │
└─────────────────────────────────────────────────────────────────────────────┘
                                      ↓
┌─────────────────────────────────────────────────────────────────────────────┐
│ Generate a report specifying the classes for the respective defects and/or specifying the defects in a │
│ particular class (e.g., the defects of interest). (320)                     │
└─────────────────────────────────────────────────────────────────────────────┘

Figure 3

MULTIMODE DEFECT CLASSIFICATION IN SEMICONDUCTOR INSPECTION

RELATED APPLICATION

This application claims priority to US Provisional Patent Application Nos. 62/701,007, filed Jul. 20, 2018, titled "Multimode Approach for Defect and Nuisance Filtering," and 62/767,916, filed Nov. 15, 2018, titled "Multimode Defect Classification in Semiconductor Inspection," which are hereby incorporated by reference in their entirety for all purposes.

TECHNICAL FIELD

This disclosure relates to semiconductor inspection, and more specifically to classifying defects detected by semiconductor inspection.

BACKGROUND

Modern optical semiconductor-inspection tools use wavelengths that are significantly longer than the dimensions of a typical defect, often by an order of magnitude or more. As such, inspection tools cannot resolve the defects and thus cannot provide images showing the defects; instead, the inspection tools merely provide an indication that a defect has been detected. Furthermore, many of the detected defects are so-called nuisance defects that do not impact device functionality and are not of interest to process-integration and yield-improvement engineers. And nuisance defects may outnumber defects of interest, for example by a factor of 1000 or more. The high volume of nuisance defects makes it impractical to perform subsequent failure analysis (e.g., visualization using a scanning electron microscope) on all identified defects. The high volume of nuisance defects also makes it impossible to determine whether a wafer should be scrapped or reworked due to a high number of defects of interest.

Existing techniques for distinguishing defects of interest from nuisance defects are limited in their effectiveness. For example, a single best optical mode for distinguishing the two types of defects may be identified and used for inspection. This approach ignores information that other optical modes can provide. Other techniques that consider the union or intersection of inspection results for multiple modes fail to consider the multiple modes in cohort and thus are too simplistic.

SUMMARY

Accordingly, there is a need for improved methods and systems of classifying defects. Such methods and systems may use inspection results for multiple modes in cohort.

In some embodiments, a defect-classification method includes scanning a semiconductor die in a semiconductor-inspection tool, using a plurality of optical modes. The method also includes steps performed in a computer system comprising one or more processors and memory storing instructions for execution by the one or more processors. The steps include identifying a plurality of defects on the semiconductor die based on results of the scanning. Respective defects of the plurality of defects correspond to respective pixel sets of the semiconductor-inspection tool. The scanning fails to resolve the respective defects. The results include multi-dimensional data based on pixel intensity for the respective pixel sets, wherein each dimension of the multi-dimensional data corresponds to a distinct mode of the plurality of optical modes. The steps also include, for the respective pixel sets, applying a discriminant function (which may also be referred to as a classification function) to the results to transform the multi-dimensional data into respective scores and, based at least in part on the respective scores, dividing the respective defects into distinct classes.

In some embodiments, a non-transitory computer-readable storage medium stores one or more programs for execution by one or more processors of a semiconductor-inspection system that includes a semiconductor-inspection tool. The one or more programs include instructions for causing a semiconductor-inspection tool to scan a semiconductor die using a plurality of optical modes and for identifying a plurality of defects on the semiconductor die based on results of the scanning. Respective defects of the plurality of defects correspond to respective pixel sets of the semiconductor-inspection tool. The scanning fails to resolve the respective defects. The results include multi-dimensional data based on pixel intensity for the respective pixel sets, wherein each dimension of the multi-dimensional data corresponds to a distinct mode of the plurality of optical modes. The one or more programs also include instructions for applying a discriminant function to the results for the respective pixel sets to transform the multi-dimensional data into respective scores and for dividing the respective defects into distinct classes, based at least in part on the respective scores.

BRIEF DESCRIPTION OF THE DRAWINGS

For a better understanding of the various described implementations, reference should be made to the Detailed Description below, in conjunction with the following drawings.

FIG. 3 shows a flowchart of a method of classifying defects in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
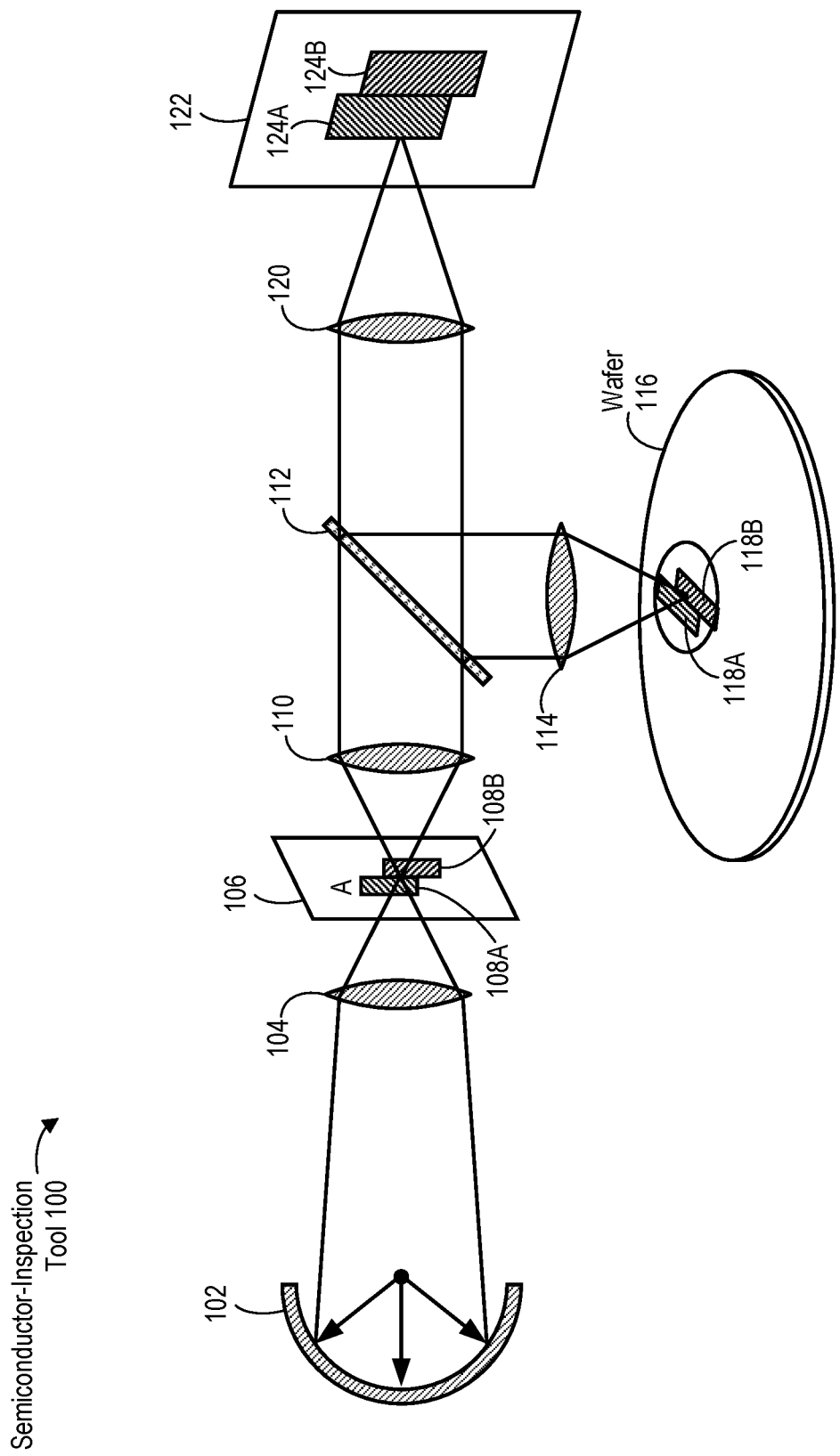
FIG. 1 is a schematic illustration of a semiconductor inspection tool in accordance with some embodiments.

FIG. 1 is a schematic illustration of a semiconductor-inspection tool 100 that scans die on a semiconductor wafer 116 (e.g., using time-domain integration (TDI)) in accordance with some embodiments. A light source 102 generates an optical beam that is provided to the semiconductor wafer 116 by lenses 104 and 110, a beam splitter 112, and an objective lens 114. The optical beam illuminates a portion of the wafer 116 that includes regions 118A and 118B. The lens 104 focuses the optical beam onto an intermediate field plane 106, where regions 108A and 108B correspond to and are optically conjugate with regions 118A and 118B respectively. Light reflected off the wafer 116 is provided by the beam splitter 112 to a lens 120, which focuses the reflected light onto respective areas on a plurality of detector arrays 122. (A single detector array 122 is shown in FIG. 1 for visual simplicity; in practice the reflected light is split and provided to a plurality of detector arrays.) The detector arrays 122 may be TDI detector arrays. The respective areas on the detector arrays 122 include regions 124A and 124B, which correspond to and are optically conjugate with regions 118A and 118B, respectively, and with regions 108A and 108B, respectively. The semiconductor-inspection tool 100 is merely one example of a semiconductor-inspection tool that can be used with the defect classification techniques disclosed herein; others are possible.

Figure 2:
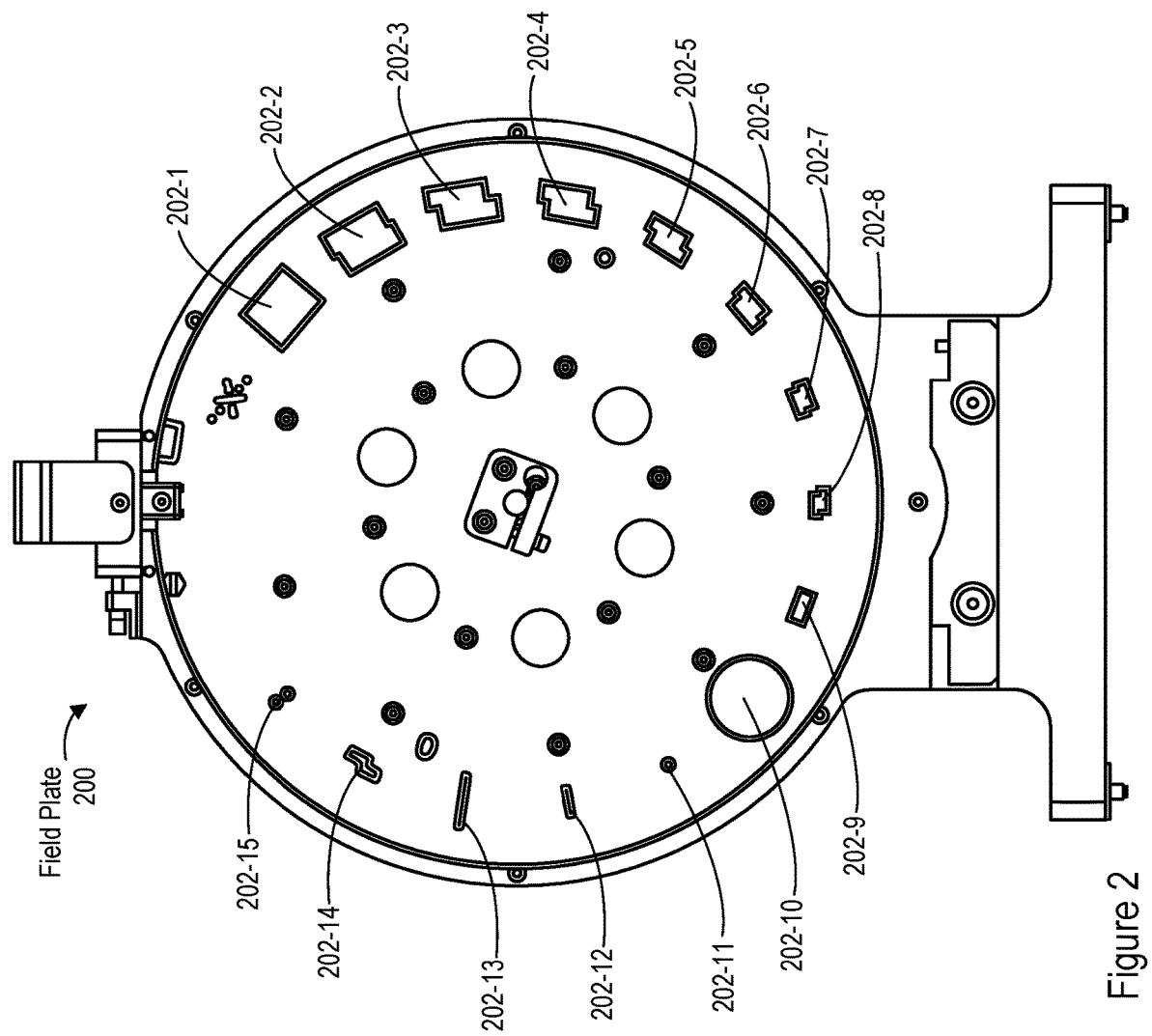
FIG. 2 shows a field plate that may be used in a semiconductor-inspection tool such as the tool of FIG. 1, in accordance with some embodiments.

FIG. 2 shows a field plate 200 that may be positioned at the intermediate field plane 106 in the semiconductor-inspection tool 100, in accordance with some embodiments. The field plate 200 has a plurality of apertures 202-1 through 202-15 that may be rotated into the optical beam (e.g., such that a single aperture 202 is positioned in the optical beam at a given time). The field plate 200 is thus rotatable about an axis that is parallel to and offset from the optical axis for the lenses 104 and 110. Respective apertures 202 may hold respective filters. At least some of the apertures 202 may hold multiple filters. For example, each of the apertures 202-2 through 202-8 may hold two filters situated adjacent to each other, with an offset. In some embodiments, each of the multiple filters in a given aperture 202 corresponds to a distinct optical mode. For example, each of the two filters in one of the apertures 202-2 through 202-8 may transmit a distinct range of wavelengths and/or a distinct polarization of light. In this manner, multiple regions (e.g., the regions 118A and 118B, FIG. 1) on the wafer 116 may be simultaneously illuminated using distinct optical modes, so that data for multiple optical modes may be obtained in a single scan of a die on the wafer 116. In some embodiments, each detector array of the plurality of detector arrays 122 is used to image a distinct optical mode of the multiple optical modes.

Figure 4:
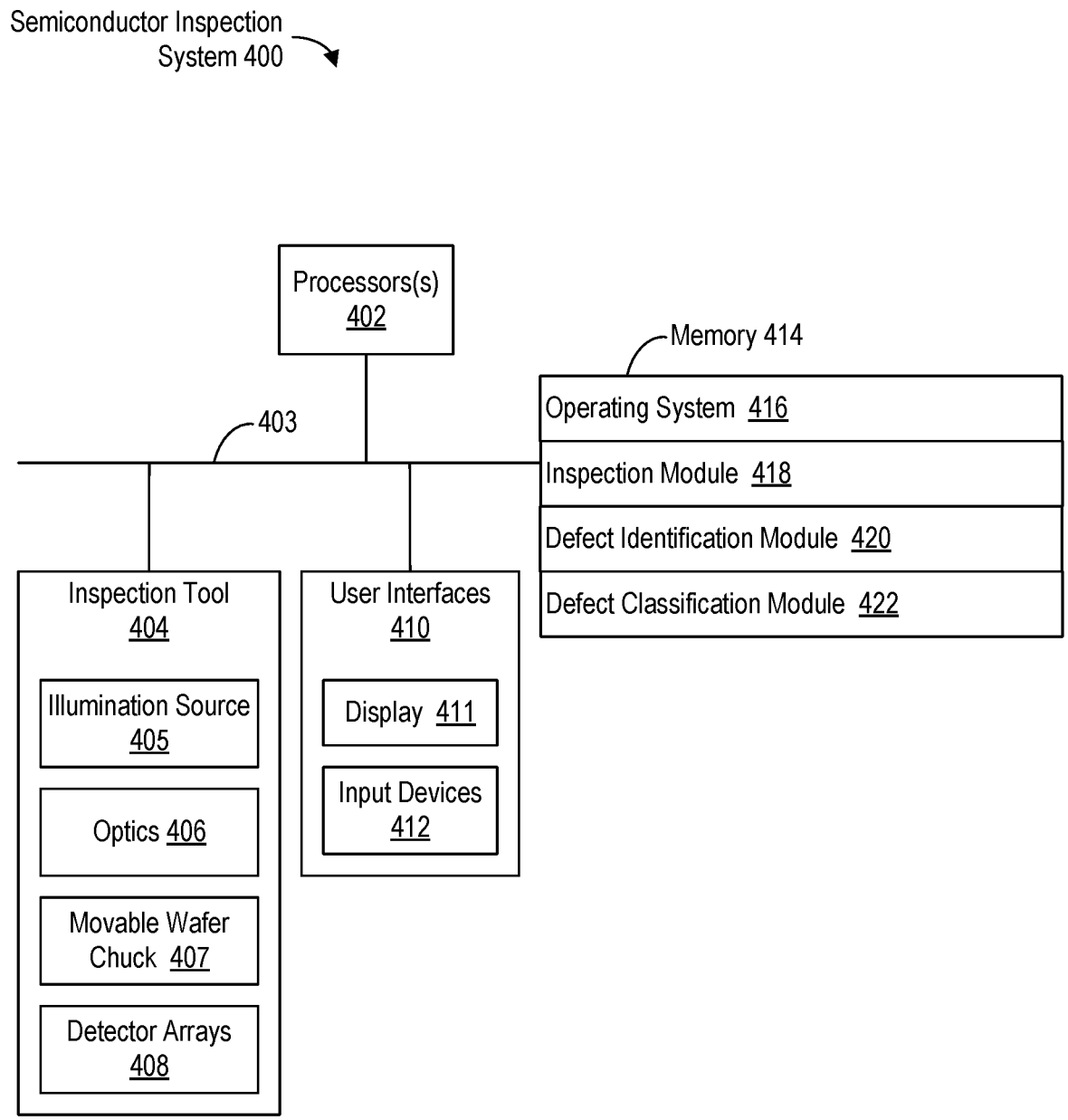
FIG. 4 is a block diagram of a semiconductor-inspection system in accordance with some embodiments.

FIG. 3 shows a flowchart of a method 300 of classifying defects in accordance with some embodiments. The method 300 may be performed using the semiconductor-inspection system 400 (FIG. 4). Steps in the method 300 may be combined or broken out. In the method 300, a semiconductor die (e.g., on the wafer 116, FIG. 1) is scanned (302) using a plurality of optical modes. This scanning is performed in a semiconductor-inspection tool (e.g., the tool 100, FIG. 1; the tool 404, FIG. 4). The number of images obtained by the scanning equals the number of optical modes in the plurality of optical modes.

In some embodiments, each optical mode of the plurality of optical modes has (304) a distinct combination of optical characteristics. In some embodiments, the optical characteristics are selected from the group consisting of range of wavelengths, polarization, focus, transmission distribution in the illumination aperture, transmission distribution in the collection aperture, and phase-shift distribution in the collection aperture. For example, a first mode has a first polarization and a second mode has a second polarization distinct from the first polarization. In the same example or another example, the first mode has a first range of wavelengths and the second mode has a second range of wavelengths distinct from the first range of wavelengths.

In some embodiments, respective portions of the semiconductor die are simultaneously illuminated (306) using the plurality of optical modes or a subset thereof. The respective portions of the semiconductor die are simultaneously imaged (306) using distinct detector arrays (e.g., detector arrays 122, FIG. 1; detector arrays 408, FIG. 4) in the tool. In some embodiments, simultaneously illuminating the respective portions of the semiconductor die using the plurality of optical modes comprises providing illumination to the semiconductor die through a plurality of filters. For example, the illumination is provided through a pair of filters situated adjacent to each other (potentially with an offset) in an aperture of a plate (e.g., an aperture 202 of the field plate 200, FIG. 2) in an illumination system of the semiconductor-inspection tool. Alternatively, or in addition, the die is scanned repeatedly using respective optical modes, once per optical mode.

A plurality of defects is identified (308) on the semiconductor die based on results of the scanning (e.g., by comparing, for each optical mode, an image obtained by the scanning to another image that does not include defects). Respective defects of the plurality of defects correspond to respective pixel sets of the semiconductor-inspection tool. (Each pixel set is the set affected by a corresponding defect.) The scanning fails to resolve the respective defects, because the respective defects are too small in comparison to the wavelength being used. The results include multi-dimensional data based on pixel intensity (e.g., pixel-intensity data or data for an attribute derived from the pixel intensity) for the respective pixel sets, wherein each dimension of the multi-dimensional data corresponds to a distinct mode of the plurality of optical modes. For example, the results include a vector $\vec{x}$ for each defect, where each entry $x_k$ of the vector $\vec{x}$ is a value based on pixel intensity (e.g., the intensity or an attribute value derived from the intensity) for a respective optical mode (i.e., for the kth optical mode) of the plurality of optical modes. Each entry of the vector $\vec{x}$ thus corresponds to a result for a distinct optical mode for a particular defect.

For the respective pixel sets, a discriminant function (i.e., a classification function) is applied (310) to the results to transform the multi-dimensional data into respective scores. In some embodiments, the discriminant function is linear. The linear discriminant function may specify a direction that separates (e.g., maximally separates) the respective defects into the distinct classes. For example, for a respective pixel set, applying the discriminant function includes determining a projection of a vector containing the multi-dimensional data onto an axis corresponding to (e.g., perpendicular to) the direction specified by the linear discriminant function. In other embodiments, the discriminant function is non-linear.

For example, to apply the discriminant function, means are calculated for each class of defects. If there are two classes indexed class 0 and class 1 (e.g., nuisance defects and defects of interest, respectively), then means $\mu_0$ and $\mu_1$ are calculated:

$$\vec{\mu}_0 = \frac{1}{N_0} \sum \vec{x}_0^j \quad (1)$$

$$\vec{\mu}_1 = \frac{1}{N_1} \sum \vec{x}_1^j \quad (2)$$

where $\vec{x}_j^i$ is the ith defect in class j, $N_0$ is the number of defects in class 0 (e.g., the number of nuisance defects), and $N_1$ is the number of defects in class 1 (e.g., the number of defects of interest). Each summation is thus over all the defects in the respective class. Covariances are then calculated using the means. For class 0 and class 1, respective covariances $S_0$ and $S_1$ are calculated:

$$S_0 = \frac{1}{N_0 - 1} \sum (\vec{x}_0^i - \vec{\mu}_0)(\vec{x}_0^i - \vec{\mu}_0)^T \quad (3)$$

$$S_1 = \frac{1}{N_1 - 1} \sum (\vec{x}_1^i - \vec{\mu}_1)(\vec{x}_1^i - \vec{\mu}_1)^T \quad (4)$$

where i indexes the defects of the respective classes. A pooled covariance $S_p$ for the defect classes is then calculated:

$$S_p = \frac{(N_0 - 1)}{(N - 2)} S_0 + \frac{(N_1 - 1)}{(N - 2)} S_1 \quad (5)$$

where $N = N_0 + N_1$.

The pooled covariance $S_p$ is used in a transformation that transforms $\vec{x}$ into a score L with a dimensionality equal to the number of classes. For the example of class 0 and class 1, $$\vec{L} = [L_0, L_1]^T. \quad (6)$$

The transformation is achieved by applying the discriminate function of step 310. In the example of a linear discriminate function, $$\vec{L} = T(\vec{x}) = \hat{W}^T \vec{x} + \vec{c}, \text{ where} \quad (7)$$

$$\hat{W} = [\vec{W}_0, \vec{W}_1], \quad (8)$$

$$\vec{W}_i^T \stackrel{\text{def}}{=} \vec{\mu}_i^T S_p^{-1}, \quad (9)$$

$$\vec{c} = [c_0, c_1]^T, \text{ and} \quad (10)$$

$$c_i \stackrel{\text{def}}{=} -\frac{1}{2} \vec{\mu}_i^T S_p^{-1} \vec{\mu}_i + \log(pr_i) \quad (11)$$

where i indexes the classes. In equation 11, $pr_i$ is a prior probability distribution that may be assumed to be constant:

$$pr_i = N_i/N \quad (12)$$

Equation 7 effectively specifies a direction that maximally separates the identified defects into class 0 and class 1. Equation 7 projects the vector $\vec{x}$, which contains the multi-dimensional data, onto an axis perpendicular to this direction. If the discriminate function is non-linear, the transformation of equation 7 is replaced by a non-linear transformation.

In some embodiments, the discriminant function is determined based on a training set of defects that includes defects from all of the distinct classes. A training set of defects is initially identified by scanning one or more die of the type of interest and then performing failure analysis to classify at least some of the identified defects (e.g., by performing scanning electron microscopy and/or using other appropriate failure-analysis techniques). For example, in equation 7, $\hat{W}$ and $\vec{c}$ may be determined based on a training set.

Based at least in part on the respective scores, the respective defects are divided (312) into distinct classes. The distinct classes may include (314) defects of interest that will impede functionality of the semiconductor die and nuisance defects that will not impede functionality of the semiconductor die. In some embodiments, the defects of interest may be divided into multiple classes (e.g., corresponding to respective types of defects).

In some embodiments, the respective scores are converted (316) to probabilities that the respective defects belong to particular classes of the distinct classes. The respective defects are classified (318) based on the probabilities. For example, the respective scores are converted to probabilities that the respective defects are defects of interest or nuisance defects, and the respective defects are classified based on the probabilities. To convert the scores obtained in equation 7 to probabilities, the softmax function may be applied to obtain:

$$P_i(\vec{x}) = \frac{\exp[L_i(\vec{x})]}{\sum_j \exp[L_j(\vec{x})]} \quad (13)$$

where i again indexes the classes, as does j. The summation in the denominator is thus over the plurality of classes (e.g., over class 0 and class 1), while the value in the numerator is for a specific class (e.g., class 0 or class 1).

In some embodiments, images obtained from the distinct detector arrays are aligned (e.g., before the defects are identified in step 308 and before application of the discriminant function in step 310). The multi-dimensional data are obtained from the aligned images. Each dimension of the multi-dimensional data corresponds to a respective image of the aligned images and also to a respective optical mode. In some embodiments, the images are aligned based on simulation results for respective optical modes, with the simulation results being matched up against the inspection results to determine alignment. The simulation results may be obtained by simulating illumination of a die with the respective optical modes, using a file (e.g., a gds file) that specifies the layout of the die.

In some embodiments, to account for potential misalignment of images for respective optical modes, steps 310 and 312 are performed both for a pixel that corresponds to an identified defect and for adjacent pixels (e.g., for a 3×3 patch of pixels centered on the pixel that corresponds to the identified defect). For example, if any of the adjacent pixels are determined to be defects of interest, then the identified defect is classified as a defect of interest.

In some embodiments, the plurality of optical modes is selected from a group of available optical modes that is larger (i.e., contains more optical modes) than the plurality of optical modes. The plurality of optical modes may be selected based on Fisher's score (or another score that indicates the efficacy of a set of optical modes in classifying defects). One or more die of the type of interest are scanned using all of the optical modes in the group of available optical modes. If the group of available optical modes has M optical modes, then Fisher's score for a subset of the group of optical modes is defined as:

$$F(X) = Tr[S_b(X) S_p^{-1}(X)], \text{ where} \quad (14)$$

-continued $$X = \{\vec{x}, \vec{x} \in R^{M'}, \text{ where } M' \leq M\}, \tag{15}$$

$$S_b = \sum_i (\mu_i - \overline{\mu})(\mu_i - \overline{\mu})^T, \tag{16}$$

$$S_p(X) = \sum_i \frac{N_i - 1}{N - 2} S_i(X), \tag{17}$$

$$S_i(X) = \frac{1}{N_i - 1} \sum_{j \text{ in Class } i} (x_i^j - \mu_i)(x_i^j - u_i)^T, \text{ and} \tag{18}$$

$$\overline{\mu} = \frac{1}{N} \sum_i \mu_i N_i. \tag{19}$$

The summations in equations 16, 17, and 19 are over all classes i (e.g., over classes 0 and 1). The summation in equation 18 is over defects in a particular class i. Fisher's score may be calculated for multiple subsets of the group, and the subset with the highest score is selected as the plurality of optical modes. For example, Fisher's score may be calculated for all subsets with two or more optical modes, for all subsets with exactly two optical modes, or for all subsets with a number of optical modes greater than or equal to two and less than or equal to a specified number.

In some embodiments, a report is generated (320) specifying the classes for the respective defects and/or specifying the defects in one or more classes (e.g., in a particular class, such as the defects of interest). For example, the report may list all of the defects (e.g., with their coordinates) and specify the class of each defect. Alternatively, the report may list defects of a specified class or set of classes (e.g., with their coordinates) and omit the other defects. For example, the report may list the defects of interest (e.g., with their coordinates) and omit the nuisance defects. The report may be graphical; for example, the report may show a map of the die with indications of the locations of defects by class, or with indications of the locations of defects in one or more classes (e.g., in a particular class, such as the defects of interest). The report may be displayed and/or transmitted to a client device for display.

In some embodiments, the steps 310 and 312 are performed in real-time, as respective defects are identified, such that defects are classified in real-time. Defects determined to be nuisance defects are ignored and thus effectively are not identified: while technically they are identified in step 308, they are not reported to the user.

In some embodiments, a decision whether to scrap, rework, or continue to process a wafer is made based at least in part on defects of interest identified using the method 300.

FIG. 4 is a block diagram of a semiconductor-inspection system 400 in accordance with some embodiments. The semiconductor-inspection system 400 includes a semiconductor inspection tool 404 and associated computer circuitry, including one or more processors 402 (e.g., CPUs), user interfaces 410, memory 414, and one or more communication buses 403 interconnecting these components. The semiconductor-inspection system 400 may also include one or more network interfaces (wired and/or wireless, not shown) for communicating with (e.g., retrieving recipes from and/or transmitting data to) remote computer systems.

The inspection tool 404 includes an illumination source 405 (e.g., light source 102, FIG. 1), illumination and collection optics 406 (e.g., the optics shown in FIG. 1, or the optics in another system), a movable wafer chuck 407, and detector arrays 408 (e.g., TDI sensor arrays) (e.g., detector arrays 122, FIG. 1). Semiconductor wafers (e.g., semiconductor wafer 116, FIG. 1) are loaded onto the movable wafer chuck 407, which moves during inspection of a die (e.g., to allow TDI to be performed).

The user interfaces 410 may include a display 411 and one or more input devices 412 (e.g., a keyboard, mouse, touch-sensitive surface of the display 411, etc.). The display 411 may display results of defect classification. For example, the display 411 may display the report of step 320 of the method 300 (FIG. 3).

Memory 414 includes volatile and/or non-volatile memory. Memory 414 (e.g., the non-volatile memory within memory 414) includes a non-transitory computer-readable storage medium. Memory 414 optionally includes one or more storage devices remotely located from the processors 402 and/or a non-transitory computer-readable storage medium that is removably inserted into the server system 400. In some embodiments, memory 414 (e.g., the non-transitory computer-readable storage medium of memory 414) stores the following modules and data, or a subset or superset thereof: an operating system 416 that includes procedures for handling various basic system services and for performing hardware-dependent tasks, an inspection module 418 (e.g., for causing steps 302, 304, and/or 306 of the method 300, FIG. 3, to be performed), a defect-identification module 420 (e.g., for performing step 308 of the method 300, FIG. 3), and a defect-classification module 422 (e.g., for performing all or some of steps 310-320 of the method 300, FIG. 3).

The memory 414 (e.g., the non-transitory computer-readable storage medium of the memory 414) thus includes instructions for performing all or a portion of the method 300 (FIG. 3). Each of the modules stored in the memory 414 corresponds to a set of instructions for performing one or more functions described herein. Separate modules need not be implemented as separate software programs. The modules and various subsets of the modules may be combined or otherwise re-arranged. In some embodiments, the memory 414 stores a subset or superset of the modules and/or data structures identified above.

FIG. 4 is intended more as a functional description of the various features that may be present in a semiconductor-inspection system than as a structural schematic. For example, the arrangement of the components of the inspection tool 404 may vary (e.g., in manners known in the art). Items shown separately could be combined and some items could be separated. Furthermore, the functionality of the semiconductor-inspection system 400 may be split between multiple devices. For example, a portion of the modules stored in the memory 414 may alternatively be stored in one or more computer systems communicatively coupled with the semiconductor-inspection system 400 through one or more networks.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A defect-classification method, comprising:
in a semiconductor-inspection tool comprising an illumination system and a plurality of detector arrays, scanning a semiconductor die using a plurality of optical modes simultaneously, comprising:
simultaneously illuminating respective portions of the semiconductor die using the plurality of optical modes, comprising providing illumination to the semiconductor die through a plurality of filters comprising a pair of filters situated adjacent to each other in an aperture of a plate in the illumination system; and
simultaneously imaging the respective portions of the semiconductor die using distinct detector arrays of the plurality of detector arrays;
in a computer system comprising one or more processors and memory storing instructions for execution by the one or more processors, identifying a plurality of defects on the semiconductor die based on results of the scanning, wherein:
respective defects of the plurality of defects correspond to respective pixel sets in the semiconductor-inspection tool, and
the results include multi-dimensional data based on pixel intensity for the respective pixel sets, wherein each dimension of the multi-dimensional data corresponds to a distinct mode of the plurality of optical modes;
in the computer system, for the respective pixel sets, applying a discriminant function to the results to transform the multi-dimensional data into respective scores; and
in the computer system, based at least in part on the respective scores, dividing the respective defects into distinct classes, comprising:
converting the respective scores to probabilities that the respective defects belong to particular classes of the distinct classes, and
classifying the respective defects based on the probabilities.

2. The method of claim 1, wherein the distinct classes comprise defects of interest that will impede functionality of the semiconductor die and nuisance defects that will not impede functionality of the semiconductor die.

3. The method of claim 2, wherein the probabilities comprise probabilities that the respective defects are defects of interest or nuisance defects.

4. The method of claim 3, further comprising, in the computer system, generating a report specifying the defects of interest.

5. The method of claim 1, wherein the discriminant function is linear.

6. The method of claim 5, wherein the discriminant function specifies a direction that maximally separates the respective defects into the distinct classes.

7. The method of claim 6, wherein applying the discriminant function comprises, for a respective pixel set, determining a projection of a vector containing the multi-dimensional data onto an axis perpendicular to the direction.

8. The method of claim 1, wherein the discriminant function is non-linear.

9. The method of claim 1, wherein the discriminant function is determined based on a training set of defects that includes defects from all of the distinct classes.

10. The method of claim 1, wherein the plurality of optical modes comprises:
a first mode having a first polarization; and
a second mode having a second polarization distinct from the first polarization.

11. The method of claim 1, further comprising, in the computer system:
aligning images obtained from the distinct detector arrays; and
obtaining the multi-dimensional data from the aligned images, wherein each dimension of the multi-dimensional data corresponds to a respective image of the aligned images.

12. The method of claim 1, further comprising, in the computer system, selecting the plurality of optical modes from a group of available optical modes;
wherein the group of available optical modes is larger than the plurality of optical modes.

13. The method of claim 1, further comprising, in the computer system, generating a report specifying the classes for the respective defects.

14. A non-transitory computer-readable storage medium storing one or more programs for execution by one or more processors of a semiconductor-inspection system that includes a semiconductor-inspection tool comprising an illumination system and a plurality of detector arrays, the one or more programs including instructions for:
identifying a plurality of defects on a semiconductor die based on results of scanning the semiconductor die with a semiconductor-inspection tool using a plurality of optical modes simultaneously, wherein:
the scanning comprises simultaneously illuminating respective portions of the semiconductor die using the plurality of optical modes, comprising providing illumination to the semiconductor die through a plurality of filters comprising a pair of filters situated adjacent to each other in an aperture of a plate in the illumination system;
the scanning further comprises simultaneously imaging the respective portions of the semiconductor die using distinct detector arrays of the plurality of detector arrays;
respective defects of the plurality of defects correspond to respective pixel sets of the semiconductor-inspection tool; and
the results include multi-dimensional data based on pixel intensity for the respective pixel sets, wherein each dimension of the multi-dimensional data corresponds to a distinct mode of the plurality of optical modes;
for the respective pixel sets, applying a discriminant function to the results to transform the multi-dimensional data into respective scores; and
based at least in part on the respective scores, dividing the respective defects into distinct classes, comprising:
converting the respective scores to probabilities that the respective defects belong to particular classes of the distinct classes, and
classifying the respective defects based on the probabilities.

* * * * *